(12) United States Patent
Kuroda et al.

(10) Patent No.: US 11,143,127 B2
(45) Date of Patent: Oct. 12, 2021

(54) VEHICLE CONTROLLER AND CONTROL METHOD PERFORMING FUEL FEEDING PROCESS WHILE STOPPING COMBUSTION FOR FILTER REGENERATION

(71) Applicant: TOYOTA JIDOSHA KABUSHIKI KAISHA, Toyota (JP)

(72) Inventors: Ryusuke Kuroda, Nagoya (JP); Masanao Idogawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 161 days.

(21) Appl. No.: 16/511,960

(22) Filed: Jul. 15, 2019

(65) Prior Publication Data

US 2020/0049085 A1    Feb. 13, 2020

(30) Foreign Application Priority Data

Aug. 7, 2018 (JP) .............................. JP2018-148052

(51) Int. Cl.
| | |
|---|---|
| *F02D 41/02* | (2006.01) |
| *F01N 3/021* | (2006.01) |
| *F01N 3/023* | (2006.01) |
| *F01N 3/025* | (2006.01) |
| *F01N 3/035* | (2006.01) |
| *F02D 37/02* | (2006.01) |
| *F02D 41/12* | (2006.01) |

(Continued)

(52) U.S. Cl.
CPC ........... *F02D 41/025* (2013.01); *F01N 3/021* (2013.01); *F01N 3/023* (2013.01); *F01N 3/025* (2013.01); *F01N 3/0238* (2013.01); *F01N 3/035* (2013.01); *F01N 3/101* (2013.01); *F01N 9/00* (2013.01); *F02D 37/02* (2013.01); *F02D 41/0087* (2013.01); *F02D 41/024* (2013.01); *F02D 41/029* (2013.01); *F02D 41/123* (2013.01); *F02D 41/30* (2013.01); *F02P 5/1512* (2013.01); *Y02A 50/20* (2018.01)

(58) Field of Classification Search
CPC ..... F02D 41/0087; F02D 41/024–0255; F02D 17/00; F02D 17/02; F01N 3/0238; F01N 3/025

See application file for complete search history.

(56) References Cited

U.S. PATENT DOCUMENTS

| | | | | |
|---|---|---|---|---|
| 2012/0102920 | A1* | 5/2012 | Pipis, Jr. | ................. F01N 3/103 60/274 |
| 2014/0041362 | A1* | 2/2014 | Ulrey | .................. F02D 41/0087 60/274 |

FOREIGN PATENT DOCUMENTS

| | | | | | |
|---|---|---|---|---|---|
| EP | | 1424482 | A2 * | 6/2004 | ............. F02D 41/40 |
| JP | | 2004124823 | A * | 4/2004 | |
| WO | WO-2015159218 | A2 * | 10/2015 | ............ B60W 20/16 |

* cited by examiner

*Primary Examiner* — Laert Dounis
(74) *Attorney, Agent, or Firm* — Oliff PLC

(57) ABSTRACT

A controller for a vehicle includes a combustion stoppage period processor and a combustion period processor. The combustion stoppage period processor is configured to selectively execute one of a fuel cut process or a fuel feeding process when stopping combustion in the cylinder in a situation in which a crankshaft of the internal combustion engine is rotating. The combustion period processor is configured to execute an increase process that increases flow speed of exhaust gas in the exhaust pipe when the fuel feeding process is executed while combustion is stopped in the cylinder and then combustion is resumed in the cylinder in which the combustion has been stopped.

9 Claims, 6 Drawing Sheets

(51) Int. Cl.
*F02D 41/00* (2006.01)
*F02P 5/15* (2006.01)
*F01N 3/10* (2006.01)
*F01N 9/00* (2006.01)
*F02D 41/30* (2006.01)

VEHICLE CONTROLLER AND CONTROL METHOD PERFORMING FUEL FEEDING PROCESS WHILE STOPPING COMBUSTION FOR FILTER REGENERATION

BACKGROUND

1. Field

The present disclosure relates to a controller for a vehicle that includes an internal combustion engine of a spark ignition type and a method for controlling the vehicle.

2. Description of Related Art

U.S. Patent Application Publication No. 2014/0041362 describes an example of an internal combustion engine that uses gasoline as fuel. An exhaust gas purifying device of the internal combustion engine includes a three-way catalyst provided in an exhaust pipe and a particulate filter disposed downstream of the three-way catalyst in the exhaust pipe.

In the internal combustion engine described in the above document, when a request torque of the internal combustion engine is decreased due to, for example, cancellation of an accelerator operation, and a small load is applied to the internal combustion engine, combustion in a cylinder may be stopped. During such a combustion stoppage period, one of a fuel cut process that stops fuel injection of a fuel injection valve or a fuel feeding process is selectively executed. The fuel feeding process injects fuel from the fuel injection valve and discharges the fuel in an unburned state from the cylinder into the exhaust pipe. According to the above publication, the fuel feeding process is executed when regenerating the particulate filter. When the regeneration is not performed, the fuel cut process is executed.

In the fuel feeding process, the fuel injected from the fuel injection valve flows through the exhaust pipe with air. When the fuel is drawn into the three-way catalyst, the fuel burns and the temperature of the three-way catalyst increases. When heat is generated in the three-way catalyst and transmitted to the particulate filter via gas in the exhaust pipe, the temperature of the particulate filter increases. More specifically, the gas in the exhaust pipe is used as a medium for transmitting heat to the particulate filter. When the temperature of the particulate filter increases, particulate matter captured in the particulate filter is burned.

The particulate filter is arranged separately from the three-way catalyst. Thus, in a process of transmitting heat from the three-way catalyst to the particulate filter via gas in the exhaust pipe, some of the heat is dissipated outside the exhaust pipe through a circumferential wall of the exhaust pipe. The heat dissipated outside the exhaust pipe does not contribute to an increase in the temperature of the particulate filter. Thus, there is room for improvement in efficiently transmitting heat from the three-way catalyst to the particulate filter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a controller for a vehicle including an internal combustion engine of a spark ignition type. The internal combustion engine includes a fuel injection valve configured to inject fuel, a three-way catalyst arranged in an exhaust pipe, and a particulate filter arranged in the exhaust pipe at a downstream side of the three-way catalyst and separate from the three-way catalyst. The internal combustion engine is configured to burn an air-fuel mixture including fuel injected from the fuel injection valve in a cylinder. The controller includes a combustion stoppage period processor and a combustion period processor. The combustion stoppage period processor is configured to selectively execute one of a fuel cut process or a fuel feeding process when stopping combustion in the cylinder in a situation in which a crankshaft of the internal combustion engine is rotating. The fuel cut process includes stopping fuel injection of the fuel injection valve. The fuel feeding process includes injecting fuel from the fuel injection valve and discharging the fuel in an unburned state from the cylinder into the exhaust pipe. The combustion period processor is configured to execute an increase process that increases flow speed of exhaust gas in the exhaust pipe when the fuel feeding process is executed while combustion is stopped in the cylinder and then combustion is resumed in the cylinder in which the combustion has been stopped.

When the fuel feeding process is executed during the combustion stoppage period of the cylinder, the fuel injected from the fuel injection valve is drawn into the three-way catalyst with air. The drawn fuel is burned in the three-way catalyst, and the temperature of the three-way catalyst increases. As described above, the heat generated in the three-way catalyst is transmitted via gas in the exhaust pipe to the particulate filter, which is arranged in the exhaust pipe separate from the three-way catalyst. Thus, the temperature of the particulate filter is increased. In this case, in the process of transmitting heat from the three-way catalyst to the particulate filter via gas in the exhaust pipe, the heat is dissipated to the exterior through the circumferential wall of the exhaust pipe. The amount of dissipated heat may increase as the flow speed of the gas in the exhaust pipe decreases.

Additionally, when the fuel feeding process is executed during the combustion stoppage period of the cylinder, heat is generated by the execution of the fuel feeding process and remains in the three-way catalyst even at a point in time when the stop period ends and combustion is resumed in the cylinder.

In this regard, in the configuration described above, when the fuel feeding process is executed during the combustion stoppage period of the cylinder and combustion is resumed in the cylinder in which the combustion has been stopped, the increase process is executed to increase the flow speed of exhaust gas in the exhaust pipe. When combustion is resumed in the cylinder, such an increase in the flow speed of the exhaust gas reduces the amount of heat dissipated outside the exhaust pipe through the circumferential wall of the exhaust pipe in the process of transmitting the heat from the three-way catalyst to the particulate filter. More specifically, after combustion is resumed in the cylinder, the flow speed of the exhaust gas in the exhaust pipe is increased so that the heat generated in the three-way catalyst by execution of the fuel feeding process is efficiently transmitted to the particulate filter.

The controller may be configured so that an output torque requested for the internal combustion engine is an internal combustion engine request torque. The internal combustion engine includes a throttle valve arranged in an intake pipe. An opening degree of the throttle valve corresponding to the internal combustion engine request torque is a reference opening degree. In the increase process, the combustion period processor is configured to increase flow speed of exhaust gas in the exhaust pipe by setting the opening degree of the throttle valve to be greater than the reference opening degree.

In the configuration described above, when the opening degree of the throttle valve is greater than the reference opening degree, the amount of air taken into the cylinder is increased as compared to when the opening degree is equal to the reference opening degree. As a result, when combustion is performed in the cylinder, the amount of exhaust gas discharged from the cylinder into the exhaust pipe is increased, and ultimately, the flow speed of the exhaust gas in the exhaust pipe is increased.

When the opening degree of the throttle valve is increased to increase the flow speed of the exhaust gas in the exhaust pipe, the intake air amount of the cylinder is increased. This increases output torque of the internal combustion engine as compared to when the increase process is not executed. Thus, the combustion period processor may be configured to correct ignition timing toward a retardation side when the increase process is being executed.

In the configuration described above, the retardation correction of ignition timing reduces output torque and compensates for an increase in the output torque of the internal combustion engine caused by setting the opening degree of the throttle valve to be greater than the reference opening degree. As a result, while limiting deviation of the output torque of the internal combustion engine from the internal combustion engine request torque, decreases in the efficiency of transmitting heat from the three-way catalyst to the particulate filter are limited.

The vehicle may include a power generator connected to the crankshaft and be configured so that output of the internal combustion engine is transmitted to a wheel of the vehicle. The controller may further include a power generator control unit configured to control the power generator so that when the increase process is being executed, the power generator generates a greater amount of power than when the increase process is not being executed.

In the configuration described above, when output torque of the internal combustion engine is increased by setting the opening degree of the throttle valve to be greater than the reference opening degree, the amount of power generated by the power generator increases. In this case, the portion of output torque of the internal combustion engine consumed by the power generator increases. As a result, even when output torque of the internal combustion engine is increased by setting the opening degree of the throttle valve to be greater than the reference opening degree, increases in torque that is transmitted to the wheels are limited. Thus, while limiting changes in speed of the vehicle, decreases in the efficiency of transmitting heat from the three-way catalyst to the particulate filter are limited.

When the temperature of the three-way catalyst is relatively low, transmission of heat from the three-way catalyst to the particulate filter is limited as compared to when the temperature of the three-way catalyst is relatively high. Thus, the controller may further include a temperature calculator configured to calculate a temperature of the three-way catalyst. The combustion period processor may be configured to end the increase process when the temperature of the three-way catalyst calculated by the temperature calculator is less than or equal to an end determination temperature.

In a situation in which combustion is stopped in the cylinder, the temperature of the three-way catalyst is greater during execution of the fuel feeding process than during execution of the fuel cut process. Thus, the combustion stoppage period processor may be configured so that when the fuel feeding process is executed while combustion is stopped in the cylinder, flow speed of gas in the exhaust pipe is increased as compared to when the fuel cut process is executed. In this configuration, even when combustion is stopped in the cylinder, the flow speed of gas flowing through the exhaust pipe is increased so that the heat generated in the three-way catalyst by execution of the fuel feeding process is efficiently transmitted to the particulate filter.

An aspect of the present disclosure provides a method for controlling a vehicle including an internal combustion engine of a spark ignition type. The internal combustion engine includes a fuel injection valve configured to inject fuel, a three-way catalyst arranged in an exhaust pipe, and a particulate filter arranged in the exhaust pipe at a downstream side of the three-way catalyst and separate from the three-way catalyst. The internal combustion engine is configured to burn an air-fuel mixture including fuel injected from the fuel injection valve in a cylinder. The method includes selectively executing one of a fuel cut process or a fuel feeding process when stopping combustion in the cylinder in a situation in which a crankshaft of the internal combustion engine is rotating, and executing an increase process that increases flow speed of exhaust gas in the exhaust pipe when the fuel feeding process is executed while combustion is stopped in the cylinder and then combustion is resumed in the cylinder in which the combustion has been stopped. The fuel cut process includes stopping fuel injection of the fuel injection valve. The fuel feeding process includes injecting fuel from the fuel injection valve and discharging the fuel in an unburned state from the cylinder into the exhaust pipe.

An aspect of the present disclosure provides a controller for a vehicle including an internal combustion engine of a spark ignition type. The internal combustion engine includes a fuel injection valve configured to inject fuel, a three-way catalyst arranged in an exhaust pipe, and a particulate filter arranged in the exhaust pipe at a downstream side of the three-way catalyst and separate from the three-way catalyst. The internal combustion engine is configured to burn an air-fuel mixture including fuel injected from the fuel injection valve in a cylinder. The controller includes circuitry. The circuitry is configured to perform selectively executing one of a fuel cut process or a fuel feeding process when stopping combustion in the cylinder in a situation in which a crankshaft of the internal combustion engine is rotating, and executing an increase process that increases flow speed of exhaust gas in the exhaust pipe when the fuel feeding process is executed while combustion is stopped in the cylinder and then combustion is resumed in the cylinder in which the combustion has been stopped. The fuel cut process includes stopping fuel injection of the fuel injection valve. The fuel feeding process includes injecting fuel from the fuel injection valve and discharging the fuel in an unburned state from the cylinder into the exhaust pipe.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A first embodiment of a vehicle controller will now be described with reference to FIGS. 1 to 6.

Figure 1:
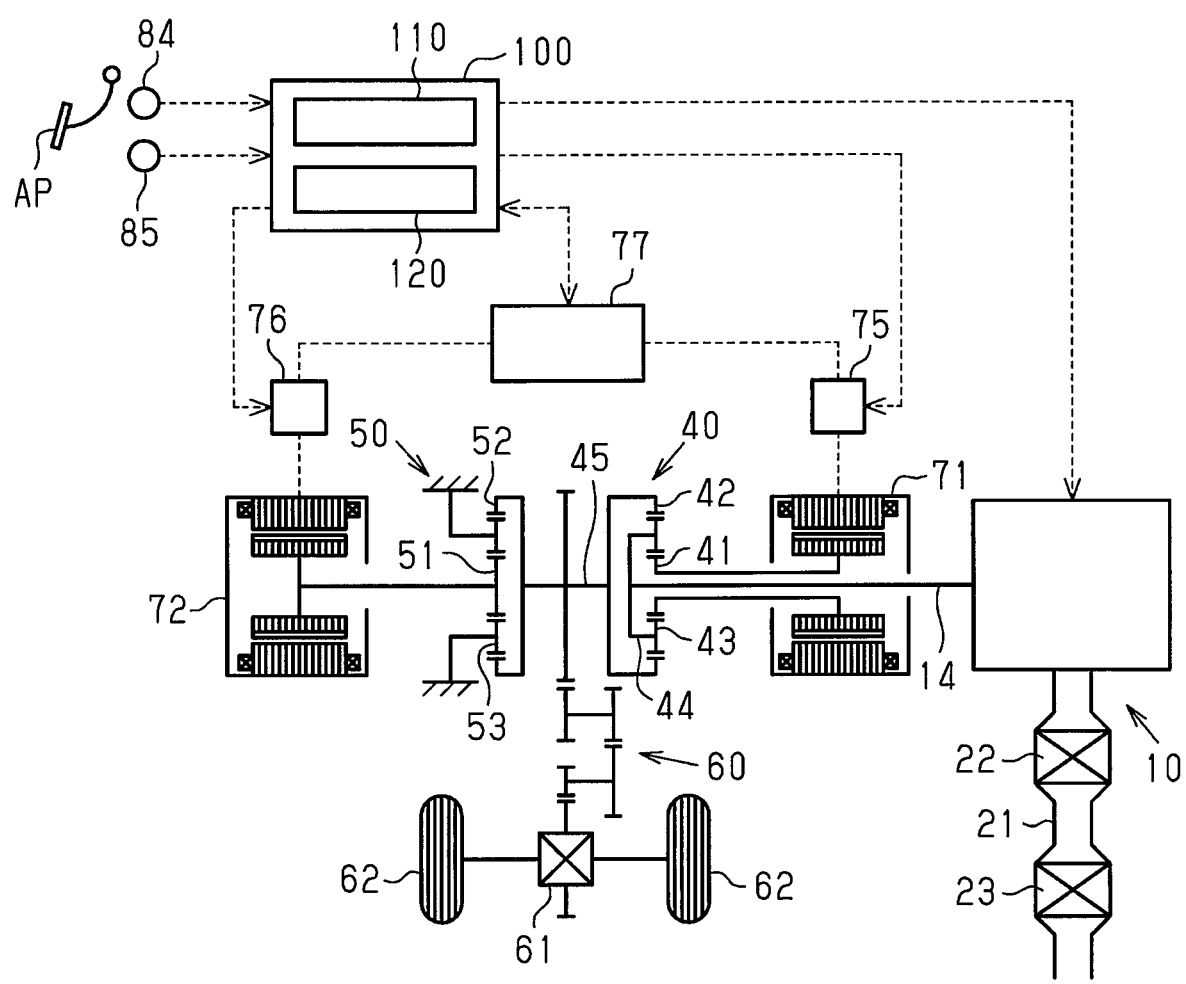
FIG. 1 is a schematic diagram showing a vehicle controller and a hybrid vehicle on which the controller is mounted in a first embodiment.

FIG. 1 shows a schematic configuration of a hybrid vehicle that includes a controller 100 of the first embodiment. As shown in FIG. 1, the hybrid vehicle includes an internal combustion engine 10 of a spark ignition type, a power distribution integration mechanism 40 connected to a crankshaft 14 of the internal combustion engine 10, and a first motor generator 71 connected to the power distribution integration mechanism 40. The power distribution integration mechanism 40 is connected to a second motor generator 72 via a reduction gear 50 and connected to drive wheels 62 via a speed reduction mechanism 60 and a differential 61.

The power distribution integration mechanism 40 is a planetary gear mechanism and includes a sun gear 41 of an external gear and a ring gear 42 of an internal gear coaxially arranged with the sun gear 41. Pinion gears 43 are disposed between the sun gear 41 and the ring gear 42 and mesh with the sun gear 41 and the ring gear 42. Each pinion gear 43 is supported by a carrier 44 so that the pinion gear 43 is capable of rotating and revolving. The first motor generator 71 is connected to the sun gear 41. The crankshaft 14 is connected to the carrier 44. A ring gear shaft 45 is connected to the ring gear 42, and the reduction gear 50 and the speed reduction mechanism 60 are connected to the ring gear shaft 45.

When an output torque of the internal combustion engine 10 is input to the carrier 44, the output torque is divided into a component for the sun gear 41 and a component for the ring gear 42. More specifically, when the output torque of the internal combustion engine 10 is input to the first motor generator 71, the first motor generator 71 generates power. Thus, in the first embodiment, the first motor generator 71 may be connected to the crankshaft 14 and may operate in a "power generator" mode.

When the first motor generator 71 is used as an electric motor, output torque of the first motor generator 71 is input to the sun gear 41. The output torque of the first motor generator 71 input to the sun gear 41 is divided into to a component for the carrier 44 and a component for the ring gear 42. When the output torque of the first motor generator 71 is input to the crankshaft 14 through the carrier 44, the crankshaft 14 is rotated. In the first embodiment, such rotation of the crankshaft 14 caused by driving the first motor generator 71 is referred to as "motoring."

The reduction gear 50 is a planetary gear mechanism and includes a sun gear 51 of an external gear and a ring gear 52 of an internal gear coaxially arranged with the sun gear 51. The sun gear 51 is connected to the second motor generator 72. A ring gear shaft 45 is connected to the ring gear 52. Pinion gears 53 are disposed between the sun gear 51 and the ring gear 52 and mesh with the sun gear 51 and the ring gear 52. While each pinion gear 53 is free to rotate, the pinion gear 53 cannot revolve.

When decelerating the vehicle, the second motor generator 72 is used as a power generator, so that the vehicle generates a regenerative braking force corresponding to the amount of power generated by the second motor generator 72. When the second motor generator 72 is used as an electric motor, the output torque of the second motor generator 72 is input to the drive wheels 62 through the reduction gear 50, the ring gear shaft 45, the speed reduction mechanism 60, and the differential 61. This allows the drive wheels 62 to rotate, resulting in the vehicle traveling.

The first motor generator 71 exchanges power with a battery 77 through a first inverter 75. The second motor generator 72 exchanges power with the battery 77 through a second inverter 76.

Figure 2:
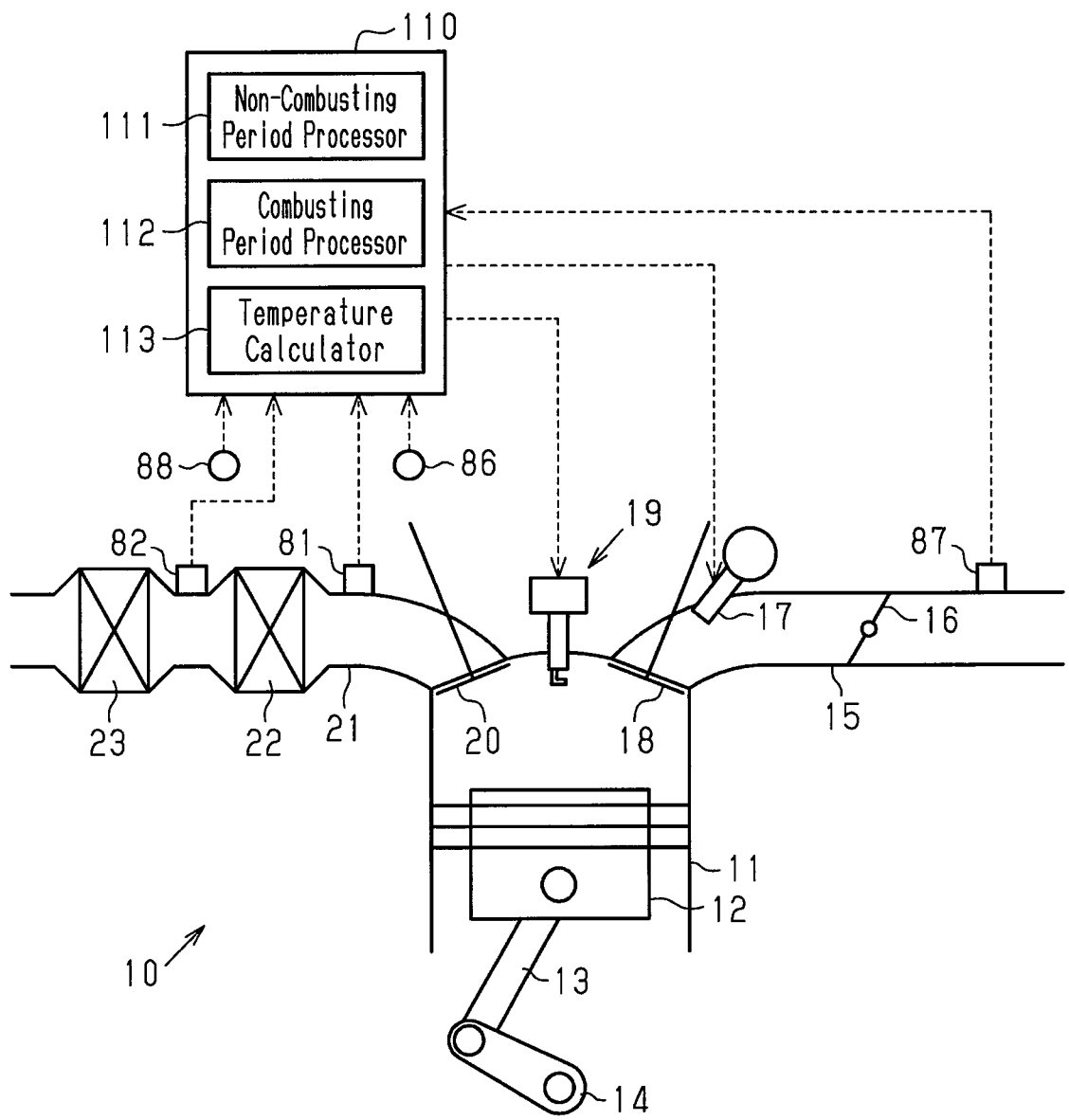
FIG. 2 is a diagram showing a functional configuration of an engine control unit included in the controller and a schematic configuration of an internal combustion engine mounted on the hybrid vehicle in the first embodiment.

As shown in FIG. 2, the internal combustion engine 10 includes a cylinder 11 that accommodates a piston 12 configured to reciprocate. The piston 12 is coupled to the crankshaft 14 by a connecting rod 13. A crank angle sensor 86 detects an engine rotational speed NE, which is the rotational speed of the crankshaft 14.

A throttle valve 16 is provided in an intake pipe 15 of the internal combustion engine 10 and rotates to adjust an intake air amount GA of the cylinder 11. The intake air amount GA is detected by an air flow meter 87. The air flow meter 87 is mounted on the intake pipe 15 at the upstream side of the throttle valve 16.

The internal combustion engine 10 further includes a fuel injection valve 17 disposed in the intake pipe 15 at the downstream side of the throttle valve 16 to inject fuel. When an intake valve 18 is open, fuel and air are drawn into the cylinder 11 through the intake pipe 15. In the cylinder 11, air-fuel mixture containing the air drawn through the intake pipe 15 and the fuel injected from the fuel injection valve 17 is burned by a spark discharge of an ignition device 19. The combustion of the air-fuel mixture generates exhaust gas in the cylinder 11, and the exhaust gas is discharged to an exhaust pipe 21 when an exhaust valve 20 is open. The exhaust pipe 21 includes a three-way catalyst 22 and a particulate filter 23 disposed at the downstream side of the three-way catalyst 22. More specifically, the particulate filter 23 is separate from the three-way catalyst 22 in the exhaust pipe 21. The particulate filter 23 is capable of capturing particulate matter contained in the exhaust gas flowing through the exhaust pipe 21.

An air-fuel ratio sensor 81 is mounted on a portion of the exhaust pipe 21 located upstream of the three-way catalyst 22 to detect an oxygen concentration in the gas flowing through the exhaust pipe 21, that is, the air-fuel ratio of the air-fuel mixture. Further, a temperature sensor 82 is mounted on a portion of the exhaust pipe 21 between the three-way catalyst 22 and the particulate filter 23 to detect the temperature of gas flowing through the exhaust pipe 21. The internal combustion engine 10 further includes a differential pressure sensor 88 that detects a differential pressure ΔPex between a portion of the exhaust pipe 21 between the particulate filter 23 and the three-way catalyst 22 and a portion of the exhaust pipe 21 located at the downstream side of the particulate filter 23.

In the internal combustion engine 10, combustion of the air-fuel mixture may be stopped in the cylinder 11 when the vehicle is traveling and the crankshaft 14 is rotating. The period during which the combustion of the air-fuel mixture is stopped in the cylinder 11 when the crankshaft 14 is rotating is referred to as a "combustion stoppage period CSP." In the combustion stoppage period CSP, the piston 12 reciprocates in synchronization with the rotation of the crankshaft 14. Thus, the air drawn into the cylinder 11 through the intake pipe 15 is discharged into the exhaust pipe 21 without being used for combustion.

In the combustion stoppage period CSP, one of a fuel cut process or a fuel feeding process is selectively executed. In the fuel cut process, the fuel injection of the fuel injection valve 17 is stopped. In the fuel feeding process, fuel is injected from the fuel injection valve 17, and the fuel is discharged from the cylinder 11 into the exhaust pipe 21 in an unburned state. When the fuel feeding process is executed, the fuel injected from the fuel injection valve 17 flows through the exhaust pipe 21 with air. The fuel is drawn into the three-way catalyst 22. When the fuel is drawn into the three-way catalyst 22, if the temperature of the three-way catalyst 22 is greater than or equal to an activation temperature and the amount of oxygen in the three-way catalyst 22 is sufficient for burning fuel, the fuel is burned in the three-way catalyst 22. As a result, the temperature of the three-way catalyst 22 increases. When the heat generated by the three-way catalyst 22 is transmitted to the particulate filter 23 through the gas flowing through the exhaust pipe 21, the temperature of the particulate filter 23 increases. Then, when oxygen is supplied to the particulate filter 23 and the temperature of the particulate filter 23 is greater than or equal to a temperature of combustion, the particulate matter captured by the particulate filter 23 is burned.

A control configuration of the hybrid vehicle will now be described with reference to FIGS. 1 and 2.

As shown in FIG. 1, a controller 100 for the hybrid vehicle calculates a request torque TQR, which is a torque to be output to the ring gear shaft 45, based on an accelerator operation amount ACC and a vehicle speed VS. The accelerator operation amount ACC is an amount of an accelerator pedal AP depressed by the driver of the vehicle and is a value detected by an accelerator operation amount sensor 84. The vehicle speed VS is a value corresponding to the travel speed of the vehicle and is detected by a vehicle speed sensor 85. The controller 100 controls the internal combustion engine 10 and the motor generators 71 and 72 based on the calculated request torque TQR. The controller 100 or an element of the controller 100 may be configured as circuitry including: 1) one or more processors that operate in accordance with a computer program (software); 2) one or more dedicated hardware circuits such as an application specific integrated circuit (ASIC) that executes at least one or more of various processes; or 3) a combination of these. The processor includes a CPU as well as memory such as a RAM and a ROM. The memory stores program codes or commands configured to cause the CPU to execute processes. The memory, that is, a computer readable medium, includes various usable media that can be accessed by a general-purpose or dedicated computer.

The controller 100 includes an engine control unit 110 that controls the internal combustion engine 10 and a motor control unit 120 that controls each of the motor generators 71 and 72. When the fuel feeding process is executed during the combustion stoppage period CSP, the motor control unit 120 controls the driving of the first motor generator 71 so that the motoring is performed. More specifically, during the combustion stoppage period CSP, the rotational speed of the crankshaft 14 is controlled through the motoring.

FIG. 2 shows a functional configuration of the engine control unit 110. The engine control unit 110 includes a combustion stoppage period processor 111, a combustion period processor 112, and a temperature calculator 113 as functional units.

The combustion stoppage period processor 111 performs various controls during the combustion stoppage period CSP. More specifically, the combustion stoppage period processor 111 controls an intake air amount GA through controlling of a throttle opening degree TA, which is the opening degree of the throttle valve 16, controls the fuel injection valve 17, and controls the ignition device 19. The combustion stoppage period processor 111 stops spark discharge of the ignition device 19 during execution of the fuel cut process and execution of the fuel feeding process. The combustion stoppage period processor 111 controls the throttle opening degree TA and the fuel injection valve 17, which will be described later.

When the air-fuel mixture is burned in the cylinder 11, the combustion period processor 112 performs various controls. More specifically, the combustion period processor 112 controls the intake air amount GA through controlling of the throttle opening degree TA and controls the fuel injection valve 17. The combustion period processor 112 controls the throttle opening degree TA and the fuel injection valve 17, which will be described later.

When burning the air-fuel mixture in the cylinder 11, the combustion period processor 112 also controls the ignition device 19. More specifically, the combustion period processor 112 causes the ignition device 19 to perform spark discharge at a time when the piston 12 reaches compression top dead center. Additionally, when the combustion stoppage period CSP ends and combustion of the air-fuel mixture is resumed in the cylinder 11, an increase process is executed to increase the flow speed of exhaust gas in the exhaust pipe 21, which will be described later. The control of the ignition device 19 performed during execution of the increase process will be described later.

The temperature calculator 113 calculates a catalyst temperature TPSC, which is an estimated value of the temperature of the three-way catalyst 22. It may be assumed that as the temperature of gas passing through the three-way catalyst 22 toward the particulate filter 23 increases, the temperature of the three-way catalyst 22 increases. Therefore, the temperature calculator 113 calculates the catalyst temperature TPSC, for example, so that the temperature of the three-way catalyst 22 increases as the temperature of gas detected by the temperature sensor 82 increases.

A flow of processes executed by the combustion stoppage period processor 111 to control the driving of the throttle valve 16 and the fuel injection valve 17 during the combustion stoppage period CSP will now be described with reference to FIG. 3. The series of processes shown in FIG. 3 is repeatedly executed during the combustion stoppage period CSP.

Figure 3:
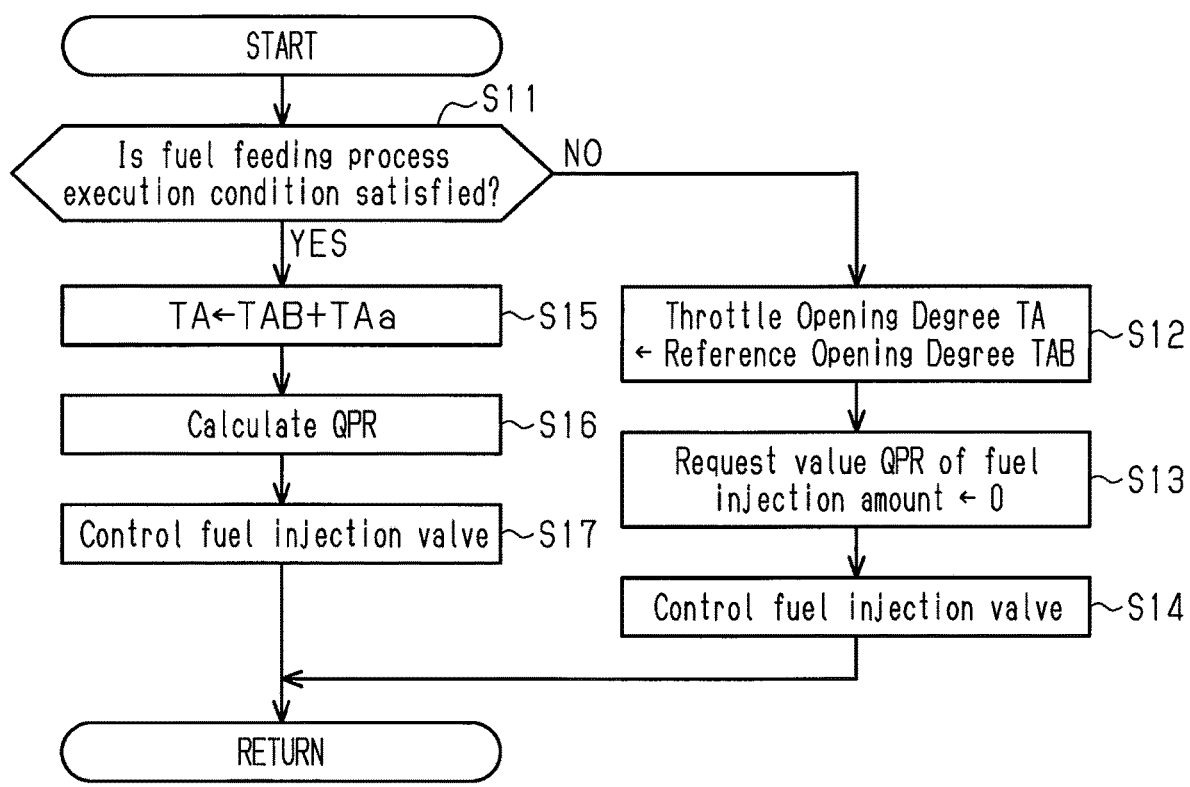
FIG. 3 is a flowchart showing procedures for controlling a fuel injection valve during a combustion stoppage period in the first embodiment.

In the series of processes shown in FIG. 3, in the first step denoted by S11, it is determined whether or not the condition for executing the fuel feeding process is satisfied.

The condition for executing the fuel feeding process will now be described. In the first embodiment, it is determined that the execution condition is satisfied when the following two conditions are both satisfied.

Condition (1-1) The catalyst temperature TPSC, which is an estimated value of the temperature of the three-way catalyst 22, is greater than or equal to a specified temperature.

Condition (1-2) The estimated value of the amount of particulate matter captured by the particulate filter 23 is greater than or equal to a capture determination amount.

In the case of condition (1-1), even when unburned fuel is drawn into the three-way catalyst 22, the fuel may not be burned if the temperature of the three-way catalyst 22 is low. In this regard, a specified temperature is set to be a reference temperature for determining whether the unburned fuel drawn into the three-way catalyst 22 can be burned. More specifically, the specified temperature is set to the activation temperature or a temperature slightly greater than the activation temperature of the three-way catalyst 22.

In the case of condition (1-2), as the amount of particulate matter captured in the particulate filter 23 increases, clogging of the particulate filter 23 advances. In this regard, the capture determination amount is set to be a reference amount for determining whether or not the clogging has advanced to a level that needs regeneration of the particulate filter 23. Increases in the captured amount have a tendency to increase the differential pressure $\Delta Pex$ between the portion of the exhaust pipe 21 between the three-way catalyst 22 and the particulate filter 23 and the portion of the exhaust pipe 21 located at the downstream side of the particulate filter 23. Thus, an estimated value of the captured amount may be calculated, for example, based on the differential pressure $\Delta Pex$.

When the condition for executing the fuel feeding process is satisfied and the fuel feeding process is started during the combustion stoppage period CSP, it is determined that the execution condition of the fuel feeding process is satisfied until the combustion stoppage period CSP ends.

In step S11, when it is determined that the condition for executing the fuel feeding process is not satisfied (S11: NO), the process proceeds to the next step denoted by S12 to execute the fuel cut process. In step S12, the throttle valve 16 is controlled so that the throttle opening degree TA is set to a reference opening degree TAB. An output torque that is requested for the internal combustion engine 10 is referred to as an internal combustion engine request torque. The reference opening degree TAB refers to the throttle opening degree TA that corresponds to the internal combustion engine request torque. During the combustion stoppage period CSP, the internal combustion engine request torque is less than or equal to zero. Thus, during the combustion stoppage period CSP, the reference opening degree TAB is set to a throttle opening degree TA corresponding to idling of the internal combustion engine 10 or a value close to the throttle opening degree TA.

When the throttle valve 16 is controlled, the process proceeds to the next step denoted by S13. In step S13, a request value QPR of the fuel injection amount of the fuel injection valve 17 is set to zero. In the next step denoted by S14, the driving of the fuel injection valve 17 is controlled based on the calculated request value QPR. In this case, fuel is not injected from the fuel injection valve 17, and the series of processes is temporarily ended.

In step S11, when it is determined that the condition for executing the fuel feeding process is satisfied (S11: YES), the process proceeds to the next step denoted by S15 to execute the fuel feeding process. In step S15, the throttle valve 16 is controlled so that the throttle opening degree TA is equal to the sum of the reference opening degree TAB and an opening degree correction amount TAa. The opening degree correction amount TAa is a positive value. More specifically, increase correction is performed on the throttle opening degree TA. Thus, during execution of the fuel feeding process, the intake air amount GA is increased as compared to during execution of the fuel cut process.

When the throttle valve 16 is controlled, the process proceeds to the next step denoted by step S16. In step S16, the request value QPR of the fuel injection amount is calculated. When the fuel feeding process is being executed, the request value QPR of the fuel injection amount is less than when the air-fuel mixture is burned in the cylinder 11. In the next step denoted by S17, the driving of the fuel injection valve 17 is controlled based on the calculated request value QPR. In this case, even during the combustion stoppage period CSP, fuel is injected from the fuel injection valve 17. The series of processes is temporarily ended.

A flow of processes executed by the combustion period processor 112 to control the driving of the throttle valve 16 and the fuel injection valve 17 when burning the air-fuel mixture in the cylinder 11 will now be described with reference to FIG. 4. The series of processes shown in FIG. 4 is repeatedly executed when burning the air-fuel mixture in the cylinder 11.

Figure 4:
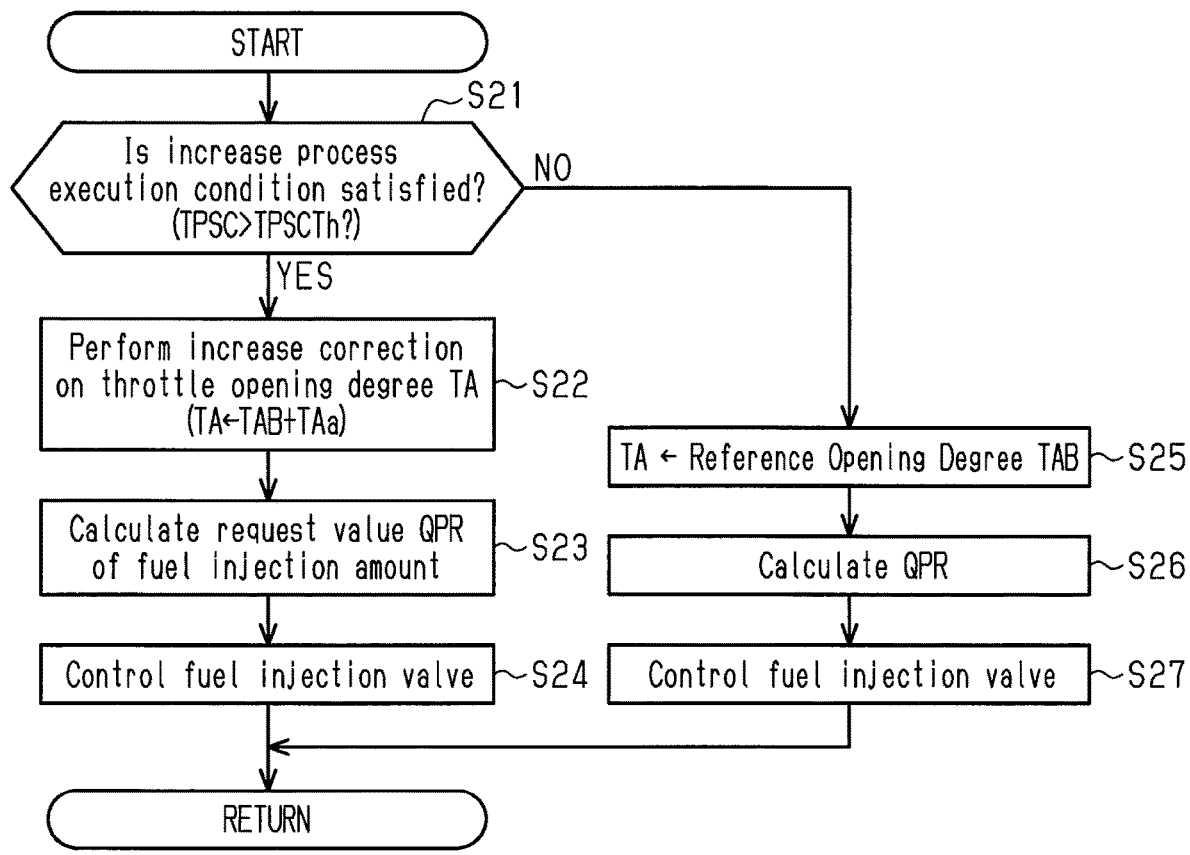
FIG. 4 is a flowchart showing procedures for controlling a throttle valve and the fuel injection valve when an air-fuel mixture is burned in the cylinder in the first embodiment.

In the series of processes shown in FIG. 4, in the first step denoted by S21, it is determined whether or not the condition for performing the increase process on the flow speed of exhaust gas in the exhaust pipe 21 is satisfied.

When the fuel feeding process is executed during the combustion stoppage period CSP, the temperature of the three-way catalyst 22 is high. Heat generated in the three-way catalyst 22 is transmitted to the particulate filter 23 via gas in the exhaust pipe 21. In this case, it is assumed that as the flow speed of the gas in the exhaust pipe 21 increases, the heat is efficiently transmitted from the three-way catalyst 22 to the particulate filter 23. In the first embodiment, when the following two conditions are both satisfied, it is determined that the condition for performing the increase process on the flow speed of exhaust gas is satisfied.

Condition (2-1) The fuel feeding process is executed during the combustion stoppage period CSP, which is before the air-fuel mixture starts to be burned.

Condition (2-2) The catalyst temperature TPSC calculated by the temperature calculator 113 is greater than an end determination temperature TPSCTh.

In the case of condition (2-1), when the fuel feeding process is executed during the combustion stoppage period CSP before the air-fuel mixture starts to be burned, a large amount of heat may be accumulated in the three-way catalyst 22. When the fuel feeding process is not executed during the combustion stoppage period CSP, the amount of heat accumulated in the three-way catalyst 22 may be insufficient to transmit the heat to the particulate filter 23. Thus, when the fuel feeding process is not executed during the combustion stoppage period CSP, it is determined that the condition for executing the increase process is not satisfied.

In the case of condition (2-2), when the catalyst temperature TPSC, which is the temperature of the three-way catalyst 22, is high, the amount of heat accumulated in the three-way catalyst 22 is greater than when the catalyst temperature TPSC is low. As the accumulated heat amount of the three-way catalyst 22 increases, the temperature of the particulate filter 23 readily increases. In other words, when the catalyst temperature TPSC is low, the temperature of the particulate filter 23 is not readily increased even if the flow speed of exhaust gas in the exhaust pipe 21 is increased. Thus, the end determination temperature TPSCTh is set to be a reference temperature for determining whether or not the temperature of the particulate filter 23 is readily increased by the heat generated in the three-way catalyst 22.

In step S21, when it is determined that the condition for executing the increase process is satisfied (S21: YES), the process proceeds to the next step denoted by S22. In step S22, increase correction of the throttle opening degree TA, or the increase process, is executed. More specifically, the throttle valve 16 is controlled so that the throttle opening degree TA is equal to the sum of the reference opening degree TAB and the opening degree correction amount TAa. When the increase correction is performed on the throttle opening degree TA as described above, the intake air amount GA is increased as compared to when the increase correction is not performed on the throttle opening degree TA. Consequently, the flow speed of exhaust gas in the exhaust pipe 21 is increased.

When the throttle valve 16 is controlled, the process proceeds to the next step denoted by S23. In step S23, the request value QPR of the fuel injection amount of the fuel injection valve 17 is calculated so that an air-fuel ratio detection value AFS is a target air-fuel ratio AFTr. The air-fuel ratio detection value AFS is an air-fuel ratio detected by the air-fuel ratio sensor 81. When the air-fuel mixture is burned in the cylinder 11, the target air-fuel ratio AFTr is set to, for example, a stoichiometric air-fuel ratio or a value close to the stoichiometric air-fuel ratio. When the intake air amount GA is increased by the increase correction of the throttle opening degree TA, the request value QPR is greater than when the increase correction is not performed on the throttle opening degree TA.

When the request value QPR is calculated, the process proceeds to the next step denoted by S24. In step S24, the fuel injection valve 17 is controlled based on the calculated request value QPR. Then, the series of processes is temporarily ended.

In step S21, when it is determined that the condition for executing the increase process is not satisfied (S21: NO), the process proceeds to the next step denoted by S25. In step S25, the throttle valve 16 is controlled so that the throttle opening degree TA is equal to the reference opening degree TAB. In the next step denoted by S26, the request value QPR of the fuel injection amount is calculated so that the air-fuel ratio detection value AFS is equal to the target air-fuel ratio AFTr. In step S27, the fuel injection valve 17 is controlled based on the calculated request value QPR. Then, the series of processes is temporarily ended. That is, in this case, the increase process is not executed.

A flow of processes executed by the combustion period processor 112 to control the ignition device 19 when the air-fuel mixture is burned in the cylinder 11 will now be described with reference to FIG. 5. The series of processes shown in FIG. 5 is repeatedly executed when burning the air-fuel mixture in the cylinder 11.

Figure 5:
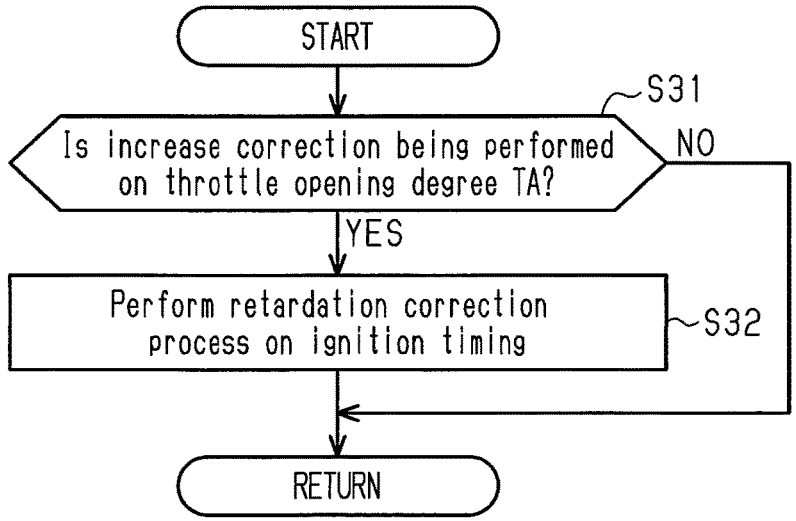
FIG. 5 is a flowchart showing procedures for adjusting ignition timing when combustion of an air-fuel mixture is resumed in the cylinder in the first embodiment.

In the series of processes shown in FIG. 5, in the first step denoted by S31, it is determined whether or not the increase correction is being performed on the throttle opening degree TA. When it is determined that the increase correction is being performed on the throttle opening degree TA (S31: YES), the process proceeds to the next step denoted by S32. In step S32, a retardation correction process is performed on ignition timing.

When the increase correction is performed on the throttle opening degree TA through the increase process, the output torque of the internal combustion engine 10 may increase due to, for example, an increase in the fuel injection amount of the fuel injection valve 17 as compared to when the increase correction is not performed. Thus, in the retardation correction process of ignition timing, the ignition timing is corrected toward the retardation side to compensate for the increase in the output torque corresponding to the increase correction of the throttle opening degree TA. In this case, the ignition timing is adjusted so that as an increase correction amount of the throttle opening degree TA (i.e., opening degree correction amount TAa) increases, the retardation correction amount of ignition timing increases. When the ignition timing is adjusted, the series of processes is temporarily ended.

In step S31, when it is determined that the increase correction is not being performed on the throttle opening degree TA (S31: NO), the series of processes is temporarily ended. That is, in this case, the retardation correction process of ignition timing, which compensates for an increase in output torque corresponding to the increase correction of the throttle opening degree TA, is not executed.

The operation and effects of the first embodiment will now be described with reference to FIG. 6.

Figure 6:
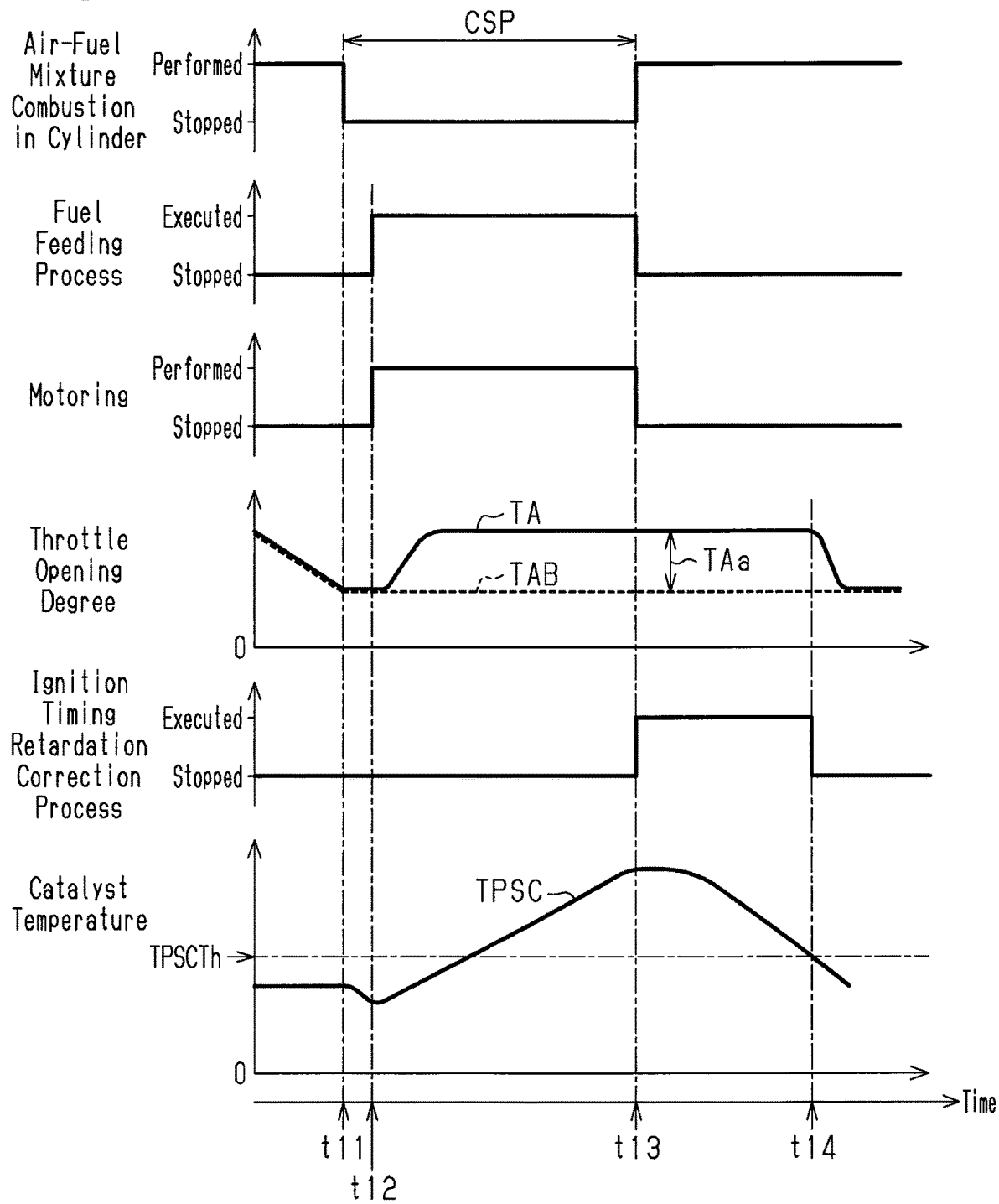
FIG. 6 is a time chart from when combustion of the air-fuel mixture is stopped in the cylinder to when combustion of the air-fuel mixture is resumed in the cylinder.

As shown in FIG. 6, at time t11, when the condition for stopping burning the air-fuel mixture in the cylinder 11 is satisfied, the combustion stoppage period CSP starts. Since the estimated value of the amount of particulate matter captured by the particulate filter 23 and calculated at time t11 is less than the capture determination amount, the condition for executing the fuel feeding process is not satisfied. Thus, the fuel cut process is executed from time t11.

When the estimated value of the captured amount of particulate matter in the particulate filter 23 that is calculated at time t12 during the combustion stoppage period CSP is greater than or equal to the capture determination amount, the condition for executing the fuel feeding process is satisfied. More specifically, at time t12, the process changes from the fuel cut process to the fuel feeding process.

As described above, when the fuel feeding process starts, motoring starts. As a result, the engine rotational speed NE is increased as compared to that prior to the start of motoring. This increases the amount of air, or oxygen, drawn into the three-way catalyst 22 as compared to prior to the start of motoring.

During execution of the fuel feeding process, unburned fuel is drawn and burned in the three-way catalyst 22. As a result, the catalyst temperature TPSC, which is the temperature of the three-way catalyst 22, is increased. More specifically, the accumulated heat amount in the three-way catalyst 22 is increased.

During the combustion stoppage period CSP, before the fuel feeding process is started, the throttle opening degree TA is the reference opening degree TAB. When the fuel feeding process is started, the throttle opening degree TA becomes greater than the reference opening degree TAB. This increases the flow speed of gas in the exhaust pipe 21 as compared to when the throttle opening degree TA is equal to the reference opening degree TAB. More specifically, when the fuel feeding process is executed, the flow speed of gas in the exhaust pipe 21 is greater than when the fuel cut process is executed.

At time t13, when the condition for stopping burning the air-fuel mixture in the cylinder 11 becomes unsatisfied, combustion of the air-fuel mixture is resumed in the cylinder 11. In the first embodiment, as described above, when the fuel feeding process is executed during the combustion stoppage period CSP and combustion of the air-fuel mixture is resumed in the cylinder 11, the increase process is executed to increase the flow speed of exhaust gas in the exhaust pipe 21. More specifically, the opening degree correction amount TAa is added to the reference opening degree TAB so that the increase correction is performed on the throttle opening degree TA. As a result, the flow speed of gas in the exhaust pipe 21 is increased as compared to when the increase process is not executed, that is, when the throttle opening degree TA is the reference opening degree TAB.

When the fuel feeding process is executed during the combustion stoppage period CSP, heat generated in the three-way catalyst 22 is transmitted to the particulate filter 23 via gas in the exhaust pipe 21. This increases the temperature of the particulate filter 23. In this case, in the process of transmitting heat from the three-way catalyst 22 to the particulate filter 23 via gas in the exhaust pipe 21, the heat is dissipated to the exterior via the circumferential wall of the exhaust pipe 21. The heat dissipation amount may increase as the flow speed of gas in the exhaust pipe 21 decreases.

When the fuel feeding process is executed during the combustion stoppage period CSP, heat is generated in the three-way catalyst 22 by the execution of the fuel feeding process and remains in the three-way catalyst 22 even at a point in time when combustion of the air-fuel mixture is resumed in the cylinder 11.

In the first embodiment, when the fuel feeding process is executed during the combustion stoppage period CSP and combustion of the air-fuel mixture is resumed in the cylinder 11 in which the combustion has been stopped, the increase process is executed. More specifically, the flow speed of exhaust gas in the exhaust pipe 21 is increased by performing the increase correction on the throttle opening degree TA. As described above, when combustion of the air-fuel mixture is resumed in the cylinder 11, the flow speed of exhaust gas is increased so that the amount of heat dissipated outside the exhaust pipe 21 via the circumferential wall of the exhaust pipe 21 is reduced in the process of transmitting the heat from the three-way catalyst 22 to the particulate filter 23. More specifically, increases in the flow speed of exhaust gas in the exhaust pipe 21 efficiently transmit heat generated in the three-way catalyst 22 to the particulate filter 23.

When the throttle opening degree TA is increased to increase the flow speed of exhaust gas in the exhaust pipe 21, the intake air amount GA of the cylinder 11 is increased. Thus, when the increase process is executed, the output torque of the internal combustion engine 10 may be increased as compared to when the increase process is not executed. In the first embodiment, when the increase process is performed on the flow speed of exhaust gas, the retardation correction is performed on the ignition timing so that the output torque of the internal combustion engine 10 will not exceed the internal combustion engine request torque. As a result, the retardation correction of the ignition timing reduces the output torque, which compensates for an increase in the output torque of the internal combustion engine 10 caused by setting the throttle opening degree TA to be greater than the reference opening degree TAB. This limits decreases in the efficiency for transmitting heat from the three-way catalyst 22 to the particulate filter 23 while limiting deviation of the output torque of the internal combustion engine 10 from the internal combustion engine request torque.

At time t14, the catalyst temperature TPSC becomes less than or equal to the end determination temperature TPSCTh. The catalyst temperature TPSC being less than or equal to the end determination temperature TPSCTh indicates that that accumulated heat amount of the three-way catalyst 22 is decreased. Thus, it is determined that the transmission of heat from the three-way catalyst 22 to the particulate filter 23 is limited. Hence, the increase process is stopped, and the retardation correction of the ignition timing is stopped. This obviates unnecessary execution of the increase correction of the throttle opening degree TA, that is, limits adverse effects on the fuel efficiency of the internal combustion engine 10.

The first embodiment further obtains the effect described below.

In the combustion stoppage period CSP, during execution of the fuel feeding process, the temperature of the three-way catalyst 22 is greater than before the fuel feeding process is started, that is, during execution of the fuel cut process. In the first embodiment, in the combustion stoppage period CSP, during execution of the fuel feeding process, the flow speed of gas in the exhaust pipe 21 is increased as compared to during execution of the fuel cut process. More specifically, the throttle opening degree TA is increased. Thus, even in the combustion stoppage period CSP, heat generated in the three-way catalyst 22 by execution of the fuel feeding process is efficiently transmitted to the particulate filter 23.

Second Embodiment

A second embodiment of a vehicle controller will now be described with reference to FIGS. 7 and 8. The second embodiment differs from the first embodiment in that the increase in torque corresponding to the increase correction of the throttle opening degree TA is compensated for by an increase in amount of power generated by the first motor generator 71 instead of the retardation correction of the ignition timing. The description will focus on the differences from the first embodiment. The same reference characters are given to those components that are the same as the corresponding components of the first embodiment. Such components will not be described in detail.

Figure 7:
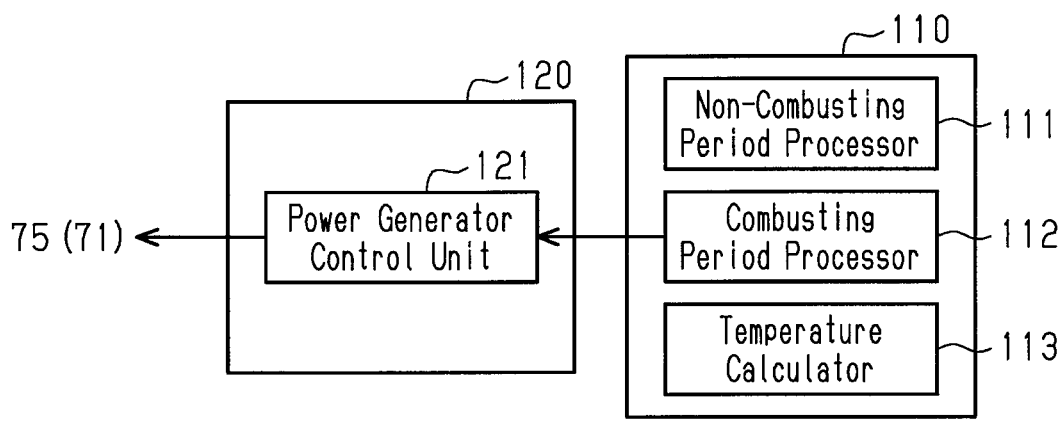
FIG. 7 is a diagram showing a functional configuration of an engine control unit and a functional configuration of a motor control unit in a second embodiment of a controller.

As shown in FIG. 7, the motor control unit 120 includes a power generator control unit 121 as a functional unit. When the air-fuel mixture is burned in the cylinder 11, the power generator control unit 121 controls a power generation amount EGC of the first motor generator 71 through controlling of the first inverter 75. More specifically, the first motor generator 71 is connected to the crankshaft 14 and operates in a "power generator" mode, which generates power based on output torque of the internal combustion engine 10. As the power generation amount EGC of the first motor generator 71 increases, torque consumed by the first motor generator 71 is increased. Thus, as the power generation amount EGC of the first motor generator 71 increases, increases in torque that is output from the internal combustion engine 10 to the ring gear shaft 45 are limited.

A flow of processes executed by the power generator control unit 121 when combustion of the air-fuel mixture is resumed in the cylinder 11 will now be described with reference to FIG. 8. The series of processes shown in FIG. 8 is repeatedly executed when the air-fuel mixture is burned in the cylinder 11.

Figure 8:
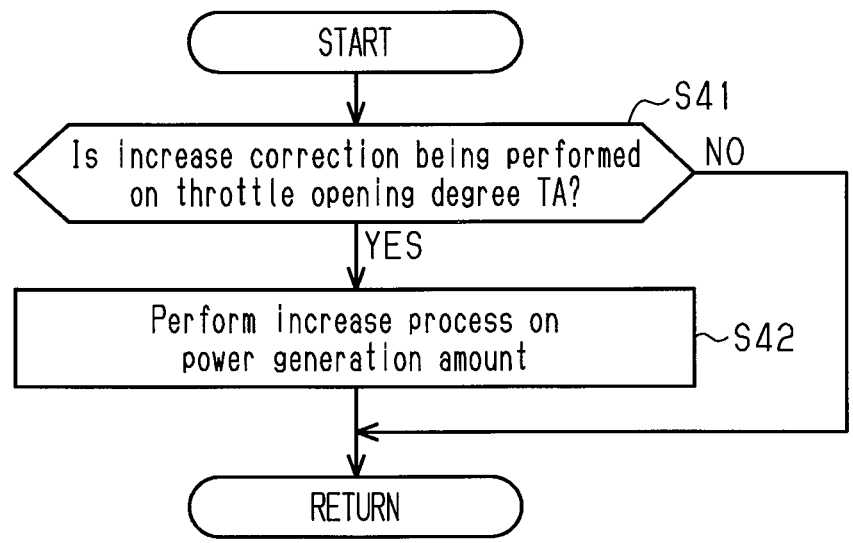
FIG. 8 is a flowchart showing procedures for controlling the amount of power generated by a first motor generator when combustion of the air-fuel mixture is resumed in the cylinder.

In the series of processes shown in FIG. 8, in the first step denoted by S41, it is determined whether or not the increase correction is being performed on the throttle opening degree TA. When it is determined that the increase correction is being performed on the throttle opening degree TA (S41: YES), the process proceeds to the next step denoted by S42. In step S42, a process for increasing the power generation amount EGC of the first motor generator 71 is executed.

When the increase correction is performed on the throttle opening degree TA, output torque of the internal combustion engine 10 is increased as compared to when the increase correction is not performed. In the process for increasing the power generation amount EGC, the first motor generator 71 is controlled through controlling of the first inverter 75 so that the power generation amount EGC is increased corresponding to the increase in output torque of the internal combustion engine 10 caused by the increase correction of the throttle opening degree TA. In this case, the first motor generator 71 is controlled through controlling of the first inverter 75 so that as the increase correction of the throttle opening degree TA (i.e., opening degree correction amount TAa) increases, the increase amount of the power generation amount EGC is increased. When the first motor generator 71 is controlled, the series of processes is temporarily ended.

In step S41, when it is determined that the increase correction is not being performed on the throttle opening degree TA (S41: NO), the process for increasing the power generation amount EGC is not executed, and the series of processes is temporarily ended.

In the second embodiment, when output torque of the internal combustion engine 10 is increased by the increase correction of the throttle opening degree TA, the power generation amount EGC of the first motor generator 71 is increased. This limits an increase in torque that is transmitted to the drive wheels 62. Thus, while limiting changes in the vehicle speed VS, decreases in the efficiency of transmitting heat from the three-way catalyst 22 to the particulate filter 23 are limited.

Modified Examples

The embodiments may be modified and implemented as below. Each of the above embodiments and the following modified examples can be implemented by being combined with each other within a scope not technically conflicting each other.

The condition for ending the increase process of the flow speed of exhaust gas in the exhaust pipe 21 may be modified. When the efficiency of increasing the temperature by transmitting heat generated in the three-way catalyst 22 to the particulate filter 23 is decreased, the increase process of the flow speed of exhaust gas may be ended. For example, when the difference in temperature between the three-way catalyst 22 and the particulate filter 23 is less than a specified temperature difference, it may be determined that the temperature increase efficiency is decreased, and the increase process may be ended.

On condition that a predetermined amount of time has elapsed from a point in time when combustion of the air-fuel mixture is resumed in the cylinder 11, the process of increasing the flow speed of exhaust gas in the exhaust pipe 21 may be ended.

During execution of the fuel feeding process, the throttle opening degree TA does not necessarily have to be greater than during execution of the fuel cut process. Even in this case, when combustion of the air-fuel mixture is resumed in the cylinder 11, the increase process is executed to start the increase correction of the throttle opening degree TA. More specifically, the increase process may be executed at least when the fuel feeding process is executed during the combustion stoppage period of the cylinder 11 and then combustion is resumed in the cylinder 11 in which the combustion has been stopped.

When the fuel feeding process is executed during the combustion stoppage period CS, the three-way catalyst 22 generates heat, and the catalyst temperature TPSC increases. The fuel feeding process may be stopped during the combustion stoppage period CSP. More specifically, during the combustion stoppage period CSP, the process may be changed from the fuel feeding process to the fuel cut process. When the fuel feeding process is ended and the fuel cut process is executed as described above, it is assumed that the catalyst temperature TPSC has not been decreased. Thus, when the fuel feeding process is ended and the fuel cut process is executed, the flow speed of gas in the exhaust pipe 21 may continue to be high.

The flow speed of gas in the exhaust pipe 21 may be increased by increasing the engine rotational speed NE. Thus, the increase process may include a process for increasing the flow speed of exhaust gas in the exhaust pipe 21 through an increase in the engine rotational speed NE. When the engine rotational speed NE is increased, the rotational speed of the ring gear shaft 45, that is, the rotational speed of the drive wheels 62, may increase. Thus, when the engine rotational speed NE is increased, the amount of power generated by the second motor generator 72 may be increased as compared to when the engine rotational speed NE is not increased. This limits an increase in the vehicle speed VS caused by the increase in the engine rotational speed NE. Thus, while limiting increases in the vehicle speed VS, decreases in the efficiency for transmitting heat from the three-way catalyst 22 to the particulate filter 23 are limited.

In the above embodiments, the ignition device 19 is not allowed to perform spark discharge during the execution of the fuel feeding process. However, during the execution of the fuel feeding process, the ignition device 19 may perform the spark discharge at a time when the air-fuel mixture is not burned in the cylinder 11. For example, when the piston 12 is located near the bottom dead center and the spark discharge is performed, the air-fuel mixture is not burned in the cylinder 11 in which the spark discharge is performed. Thus, during the execution of the fuel feeding process, even when spark discharge is performed, the fuel injected from the fuel injection valve 17 may be discharged from the cylinder 11 into the exhaust pipe 21 in an unburned state.

The controller for an internal combustion engine may be applied to an internal combustion engine that includes a direct injection valve, which is a fuel injection valve that directly injects fuel into the cylinder 11. In this case, during the execution of the fuel feeding process, fuel is injected from the direct injection valve into the cylinder 11, and the fuel is discharged into the exhaust pipe 21 in an unburned state. Thus, unburned fuel is drawn into the three-way catalyst 22.

The system of a hybrid vehicle may be configured to control the rotational speed of the crankshaft 14 by driving a motor and may differ from the system shown in FIG. 1.

In the first embodiment, the controller for an internal combustion engine may be embodied in a device for controlling an internal combustion engine mounted on a vehicle that does not have a power source other than the internal combustion engine. Even in an internal combustion engine mounted on such a vehicle, the combustion of the air-fuel mixture in the cylinder may be stopped under a situation in which the crankshaft 14 is rotating with inertia. When the execution condition of the fuel feeding process is satisfied during the combustion stoppage period CSP, the fuel feeding process is executed, and the temperature of the three-way catalyst 22 increases.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for a vehicle including an internal combustion engine of a spark ignition type, the internal combustion engine including a throttle valve arranged in an intake pipe, a fuel injection valve configured to inject fuel, a three-way catalyst arranged in an exhaust pipe, and a particulate filter arranged in the exhaust pipe at a downstream side of the three-way catalyst and separate from the three-way catalyst, and the internal combustion engine being configured to burn an air-fuel mixture including fuel injected from the fuel injection valve in a cylinder, the controller comprising:
    a combustion stoppage period processor configured to selectively execute one of a fuel cut process or a fuel feeding process when stopping combustion in the cylinder in a situation in which a crankshaft of the internal combustion engine is rotating, the fuel cut process including stopping fuel injection of the fuel injection valve, and the fuel feeding process including injecting fuel from the fuel injection valve and discharging the fuel in an unburned state from the cylinder into the exhaust pipe;
    a combustion period processor configured to execute an increase process that increases a flow speed of exhaust gas in the exhaust pipe after combustion is resumed in the cylinder in which the combustion had been stopped during execution of the fuel feeding process; and
    a temperature calculator configured to calculate a temperature of the three-way catalyst, wherein
    an output torque requested for the internal combustion engine is an internal combustion engine request torque,
    an opening degree of the throttle valve corresponding to the internal combustion engine request torque is a reference opening degree,
    the combustion period processor is configured to, in the increase process, increase the flow speed of the exhaust gas in the exhaust pipe by setting the opening degree of the throttle valve to be greater than the reference opening degree, and
    the combustion period processor is configured to (a) execute the increase process by setting the opening degree of the throttle valve to be greater than the reference opening degree when the temperature of the three-way catalyst is greater than an end determination temperature, and (b) not execute the increase process and instead set the opening degree of the throttle valve to the reference opening degree when the temperature of the three-way catalyst is less than or equal to the end determination temperature.

2. The controller according to claim 1, wherein the combustion period processor is configured to correct ignition timing toward a retardation side when the increase process is being executed.

3. The controller according to claim 1, wherein
    the vehicle includes a power generator connected to the crankshaft and configured so that output of the internal combustion engine is transmitted to a wheel of the vehicle, and
    the controller further comprises a power generator control unit configured to control the power generator so that when the increase process is being executed, the power generator generates a greater amount of power than when the increase process is not being executed.

4. The controller according to claim 1, wherein the combustion period processor is configured to end the increase process when, after the combustion has been resumed, the temperature of the three-way catalyst calculated by the temperature calculator becomes less than or equal to the end determination temperature.

5. The controller according to claim 1, wherein the combustion stoppage period processor is configured so that when the fuel feeding process is executed while combustion is stopped in the cylinder, the flow speed of the exhaust gas in the exhaust pipe is increased as compared to when the fuel cut process is executed.

6. A method for controlling a vehicle including an internal combustion engine of a spark ignition type, the internal combustion engine including a throttle valve arranged in an intake pipe, a fuel injection valve configured to inject fuel, a three-way catalyst arranged in an exhaust pipe, and a particulate filter arranged in the exhaust pipe at a downstream side of the three-way catalyst and separate from the three-way catalyst, and the internal combustion engine being configured to burn an air-fuel mixture including fuel injected from the fuel injection valve in a cylinder, the method comprising:
    selectively executing one of a fuel cut process or a fuel feeding process when stopping combustion in the cylinder in a situation in which a crankshaft of the internal combustion engine is rotating, the fuel cut process including stopping fuel injection of the fuel injection valve, and the fuel feeding process including injecting fuel from the fuel injection valve and discharging the fuel in an unburned state from the cylinder into the exhaust pipe;

executing an increase process that increases a flow speed of exhaust gas in the exhaust pipe after combustion is resumed in the cylinder in which the combustion had been stopped during execution of the fuel feeding process; and calculating a temperature of the three-way catalyst, wherein an output torque requested for the internal combustion engine is an internal combustion engine request torque, an opening degree of the throttle valve corresponding to the internal combustion engine request torque is a reference opening degree, in the increase process, the flow speed of the exhaust gas in the exhaust pipe is increased by setting the opening degree of the throttle valve to be greater than the reference opening degree, and after the combustion is resumed in the cylinder in which the combustion had been stopped during execution of the fuel feeding process: (a) the increase process is executed by setting the opening degree of the throttle valve to be greater than the reference opening degree when the temperature of the three-way catalyst is greater than an end determination temperature, and (b) the increase process is not executed, and instead the opening degree of the throttle valve is set to the reference opening degree when the temperature of the three-way catalyst is less than or equal to the end determination temperature.

7. The method according to claim 6, wherein the increase process is ended when, after the combustion has been resumed, the temperature of the three-way catalyst calculated by the temperature calculator becomes less than or equal to the end determination temperature.

8. A controller for a vehicle including an internal combustion engine of a spark ignition type, the internal combustion engine including a throttle valve arranged in an intake pipe, a fuel injection valve configured to inject fuel, a three-way catalyst arranged in an exhaust pipe, and a particulate filter arranged in the exhaust pipe at a downstream side of the three-way catalyst and separate from the three-way catalyst, and the internal combustion engine being configured to burn an air-fuel mixture including fuel injected from the fuel injection valve in a cylinder, the controller comprising circuitry, wherein the circuitry is configured to perform:

selectively executing one of a fuel cut process or a fuel feeding process when stopping combustion in the cylinder in a situation in which a crankshaft of the internal combustion engine is rotating, the fuel cut process including stopping fuel injection of the fuel injection valve, and the fuel feeding process including injecting fuel from the fuel injection valve and discharging the fuel in an unburned state from the cylinder into the exhaust pipe;

executing an increase process that increases a flow speed of exhaust gas in the exhaust pipe after combustion is resumed in the cylinder in which the combustion had been stopped during execution of the fuel feeding process; and calculating a temperature of the three-way catalyst, wherein an output torque requested for the internal combustion engine is an internal combustion engine request torque, an opening degree of the throttle valve corresponding to the internal combustion engine request torque is a reference opening degree, in the increase process, the flow speed of the exhaust gas in the exhaust pipe is increased by setting the opening degree of the throttle valve to be greater than the reference opening degree, and after the combustion is resumed in the cylinder in which the combustion had been stopped during execution of the fuel feeding process: (a) the increase process is executed by setting the opening degree of the throttle valve to be greater than the reference opening degree when the temperature of the three-way catalyst is greater than an end determination temperature, and (b) the increase process is not executed, and instead the opening degree of the throttle valve is set to the reference opening degree when the temperature of the three-way catalyst is less than or equal to the end determination temperature.

9. The controller according to claim 8, wherein the controller circuitry is configured to end the increase process when, after the combustion has been resumed, the temperature of the three-way catalyst calculated by the temperature calculator becomes less than or equal to te end determination temperature.

* * * * *